US006237984B1

(12) United States Patent
Cross (10) Patent No.: US 6,237,984 B1
(45) Date of Patent: May 29, 2001

(54) VISOR (76) Inventor: John Robert Cross, 55 Ambleside Gardens, Gunthorpe, Peterborough, Cambridgeshire PE4 7ZY (GB)

( * ) Notice: Subject to any disclaimer, the term of this patent is extended or adjusted under 35 U.S.C. 154(b) by 0 days.

(21) Appl. No.: 09/142,394

(22) PCT Filed: Mar. 5, 1997

(86) PCT No.: PCT/GB97/00612

§ 371 Date: May 4, 1999

§ 102(e) Date: May 4, 1999

(87) PCT Pub. No.: WO97/32743

PCT Pub. Date: Sep. 12, 1997

(30) Foreign Application Priority Data

Mar. 5, 1996 (GB) .................................................. 9604682
Aug. 1, 1996 (GB) .................................................. 9616200

(51) Int. Cl.[7] .......................................................... B60J 3/02
(52) U.S. Cl. ............................................................. 296/97.4
(58) Field of Search ................... 296/97.4, 97.6, 296/97.8

(56) References Cited

U.S. PATENT DOCUMENTS

| 2,101,901 | * | 12/1937 | Fletcher | 160/160 |
| 3,306,657 | * | 2/1967 | Turner | 296/97.6 |
| 3,857,630 | * | 12/1974 | Gonzalez | 359/601 |
| 4,690,451 | * | 9/1987 | Killar | 296/97.6 |
| 4,810,023 | * | 3/1989 | Kawada . | |
| 4,844,530 | * | 7/1989 | Mahler et al. | 296/97.1 |
| 5,042,867 | * | 8/1991 | Crotty, III et al. . | |
| 5,104,174 | * | 4/1992 | Gute . | |
| 5,283,683 | * | 2/1994 | Yamamoto . | |
| 5,466,029 | * | 11/1995 | Zetterlund | 296/97.8 |
| 5,478,131 | * | 12/1995 | Marks | 296/97.6 |
| 5,490,708 | * | 2/1996 | Lee | 296/97.8 |
| 5,513,892 | * | 5/1996 | Thomas . | |
| 5,855,405 | * | 1/1999 | Robles | 296/97.4 |

FOREIGN PATENT DOCUMENTS

| 488579 | * | 5/1970 | (CH) . | |
| 2332613 | * | 1/1975 | (DE) | 296/97.8 |
| 0291435 | * | 11/1988 | (EP) . | |
| 0 563 544 A1 | * | 2/1993 | (EP) . | |
| 2728198 | * | 6/1996 | (FR) . | |
| 2235172 | * | 2/1991 | (GB) | 296/97.6 |
| 89/08823 | * | 9/1989 | (WO) . | |
| 94/08811 | * | 4/1994 | (WO) . | |

* cited by examiner

Primary Examiner—D. Glenn Dayoan
Assistant Examiner—Patricia Engle
(74) Attorney, Agent, or Firm—Barnes & Thornburg (57) ABSTRACT A visor (10) comprises a main movable first visor part comprising back plate (12) and front plate (14) and an auxiliary sheet-like second visor part (16) therebetween. The sheet-like second visor part is carried on the first visor part (12, 14) by, for example, arms (30) to allow movement in the plane of the sheet. The arms (30) guide the auxiliary visor part (16) during movement downwards and sideways from a stowed position on the first visor part (12, 14). Alternatively, the auxiliary visor part may be guided by a V-shaped slot (54) or circular groove arrangement (140).

12 Claims, 12 Drawing Sheets

VISOR

CROSS-REFERENCES TO RELATED APPLICATIONS

This application is a U.S. national application of international application Ser. No. PCT/GB97/00612 filed Mar. 5, 1997, which claims priority to United Kingdom (GB) Ser. Nos. 9604682.2 and 9616200.3 filed Mar. 5, 1996, and Aug. 1, 1996, respectively.

The invention relates to a visor, especially a visor for a vehicle.

Sun visors for vehicles are known and are generally pivotal by mounted inside the vehicle above the windscreen. The visor is pivotable between a retracted position in which it lies against a roof lining of the vehicle and an operative position in which it lies against the windscreen to block bright sunlight. Some drivers, because of their height, experience difficulties with visors. If a driver is small the visor may not be large enough to obscure the sun. Also when the road ahead is wet and the sun is bright, drivers may be dazzled by reflections. Auxiliary visors are known which are intended to lessen the dazzling effects of sun reflections. Such visors usually comprise a sheet of coloured transparent material which can be pulled from a main part of the visor to a position below the main visor part to reduce the glare from a low sun, reflections and oncoming headlights.

An object of the present invention is to provide an improved visor which can be used to reduce glare from light sources at low level.

According to a first aspect of the invention there is provided a visor comprising a main movable first visor part and an auxiliary sheet-like second visor part carried on the first visor part by for movement in the plane of the sheet, and guide means for guiding the second visor part during movement downwardly and sideways from a stowed position on the first visor part.

In that way the second visor part is guided along a particular path of movement which reduces the possibility that the second part may strike an adjacent component, for instance the rear view mirror of a motor vehicle in which the visor is, in use, installed.

The second part is preferably movable from a stowed position in which it is arranged so as not to protrude, at least by any appreciable amount, beyond an edge of the first part and an operative position in which the second part extends beyond said edge of the first part.

The second part may be transparent. The second part may be coloured and, preferably, the colour is chosen to coordinate with the interior trim of the vehicle.

The movement of the second part is preferably translational.

Mounting means may be provided for mounting the second visor part on the first visor part.

In one embodiment, the mounting means comprises spaced apart arms connected, eg pivotally, to the first part. The arms preferably constitute said guide means. Each arm may be mounted on a wheel. In a preferred embodiment one of the first and second visor parts carries gearing which drives the wheels (which may be in the form of gear wheels) such that, during movement of the second part, both arms preferably rotate in the same direction. In that case, the arms preferably rotate through the same angle.

Drive means may be provided for causing the second part of the visor to move relative to the first part. Where arms are provided, the drive means preferably causes the arms to rotate. The drive means may include a gearing arrangement, for example a rack and pinion gearing. The drive means may include an electric motor or a manually operable driving member.

Where one of the first and second parts carried gearing the gearing may comprise a drive input gear, a drive output gear for rotating each arm and an idler gear between the drive input gear and each drive output gear.

In another embodiment the drive means is in the form of a belt and pulley arrangement for driving the arms. The belt and pulley arrangement preferably comprises respective driven pulleys carrying the two said arms and drive pulley means for driving the driven pulleys through belting.

The guide means may comprise a track on one of the first and second parts and a co-operable member on the other of the first and second parts. The track may comprise a diagonal slot formed in one of the first and second parts, the member being on the other part. The track may comprise two diagonal slots extending transversely relative to one another and intersecting one another. The track may comprise a V-shaped slot. Two tracks may be provided, each track being co-operable with a respective member. The or each track is preferably formed in the second part and the or each member is formed or provided on the first part. The or each track may have a notched portion which receives the member when the second part is in the stowed position to retain the second part in the stowed position. In a still further embodiment, the or each track may be circular. In such a case the track may comprise a groove for receiving a pin or stud. The pin or stud may be provided on the second part.

Where the visor comprises a track, drive means is preferably provided for moving the visor from the stowed position. The drive means may comprise a member pivotable about an axis normal to the visor having a part spaced from the axis and connected to the second visor part to allow actuation of the visor by rotating about the axis. Preferably the member includes a row of crenellations and the first visor part includes an element such as a resilient tang which engages the crenellations. In that way, the member is retained in position by the tang engaging the crenellations. That allows the second visor part to be held firm in any position of deployment.

The drive means may comprise a motor drivably connected to the aforesaid pivotable member. Alternatively, the pivotable member may be manually actuated. The motor may be drivably be connected to the pivotable member by means of a gear arrangement or by means of belts and pulleys.

In another embodiment the track is formed with a row of teeth on one side and a toothed wheel with an axis normal to the visor is located in the track and engages the row of teeth. The wheel can be rotated to effect movement of the second visor part. In one embodiment, the toothed wheel also runs through a rack of teeth in a further member and the further member has an actuating toothed wheel in the rack to effect movement of the rack. Thus by rotating the actuating wheel the further member moves laterally which, in turn, rotates the toothed wheel in the track to effect movement of second visor part. Alternatively, the further member is moved manually by means of a projecting tab which extends through a slot in the face of the visor. In a further embodiment, the further member is moved by a motor connected to the actuating slotted wheel, for instance by means of a belt and pulley.

The first and second parts of the visor may be substantially flat.

The first part may be hinged in a vehicle, in use, for movement between its retracted position away from a windscreen of the vehicle and a position adjacent the windscreen.

The first and/or second part is/are preferably substantially rectangular.

According to a second aspect of the invention there is provided a retro-fittable auxiliary visor for a vehicle comprising a first part, a sheet-like second part carried on the first part for movement in the plane of the sheet and guide means for guiding the second part during movement downwardly and sideways from a stowed position on the first part.

The retro-fitted auxiliary visor may have features of the visor set out in the first aspect of the invention or any of the consistory clauses relating thereto.

Visors in accordance with the invention will now be described in detail, by way of example with reference to the accompanying drawings in which.

Figure 1:
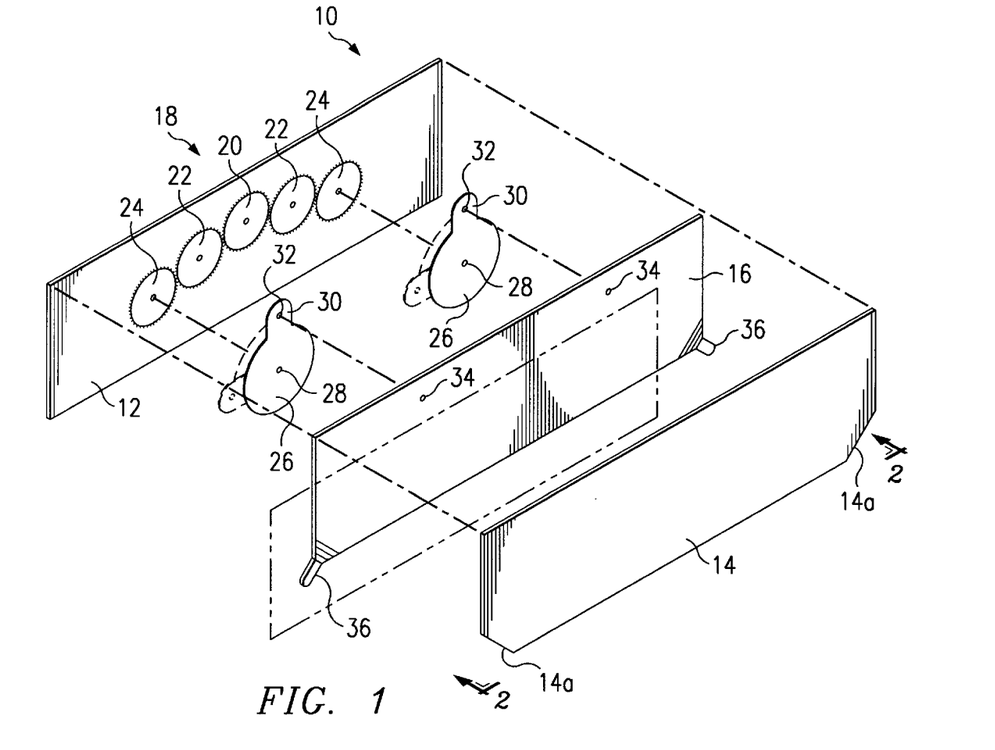
FIG. 1 is an exploded perspective view of a visor in accordance with the invention.

In FIG. 1 a visor 10 comprises a back plate 12 and front plate 14 (constituting collectively the aforesaid first visor part) and a sheet-like second auxiliary visor part 16 located therebetween. The back plate 12 and front plate 14 are suitably secured to each other. The sheet-like second auxiliary visor part 16 is hereinafter referred to as an auxiliary visor sheet 16.

The back plate 12 carries a gearing arrangement generally indicated at 18. The gearing arrangement 18 comprises a central toothed gear wheel 20 and two toothed idler gear wheels 22 located one each side of the central wheel 20. Each idler wheel 22 is arranged in mesh with the central wheel 20. The gearing arrangement 18 further comprises toothed outer gear wheels 24 which mesh with the respective idler wheels 22. Each outer wheel 24 drivably carries a mounting member 26 comprising a substantially circular body 28 with an arm 30 projecting radially therefrom. Each arm 30 has a mounting point 32 at its free end for the auxiliary visor 16. The auxiliary visor sheet 16 is pivotally mounted at spaced mounting points 34 to the respective auxiliary visor mounting points 32 on the mounting members 26.

The auxiliary visor sheet 16 is substantially rectangular and has a pull tab 36 at each bottom corner. The auxiliary visor sheet 16 is made from coloured or transparent material. The colour can be selected to complement the interior trim of the vehicle in which the visor is to be located.

The front plate 14 is substantially rectangular and has bottom corner portions 14a formed to allow easy access to the pull tabs 36.

In use, the user grasps one pull tab 36 and pulls the auxiliary visor sheet 16 from between the front and back plates 12, 14. The mounting members 26 rotate as shown in chain dotted lines in FIG. 1 as the auxiliary visor sheet 16 is pulled down thereby guiding the auxiliary visor sheet downwards and sideways. The gearing arrangement 18 causes the mounting members 26 rotate in the same direction and through the same angle. In that way it will be seen that the auxiliary visor sheet 16 moves in parallelogram fashion relative to the back plate 12 during the course of its movement. The auxiliary visor sheet can be pulled in either direction from the first visor part 12, 14 by using the appropriate pull tab 36. The back and front plates 12, 14 are joined together in such a way that the auxiliary visor sheet 16 can easily slide therebetween.

Figure 2:
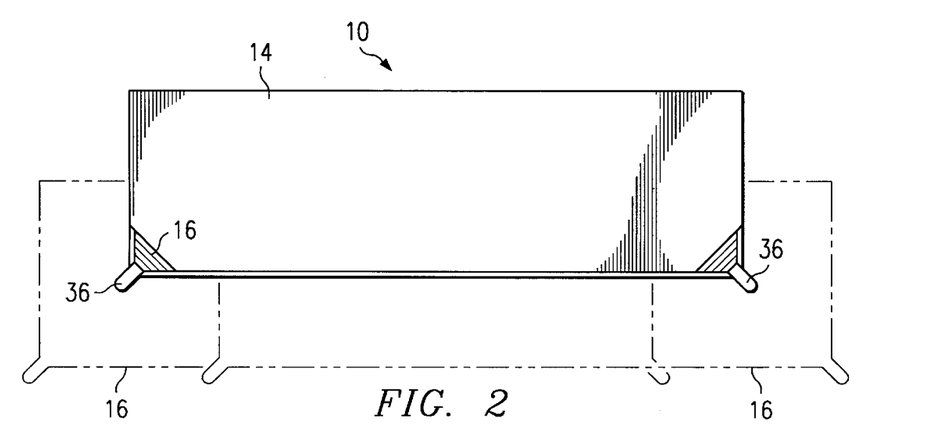
FIG. 2 is an elevation of the visor of FIG. 1 looking in the direction of arrow II in FIG 1 showing the auxiliary sheet-like visor part of the visor in both stowed and operative positions.

FIG. 2 shows the visor of FIG. 1 with the auxiliary visor sheet 16 shown in the normally stowed position. The left and right extended positions of the auxiliary visor sheet 16 are shown in chain dotted lines.

Figure 3:
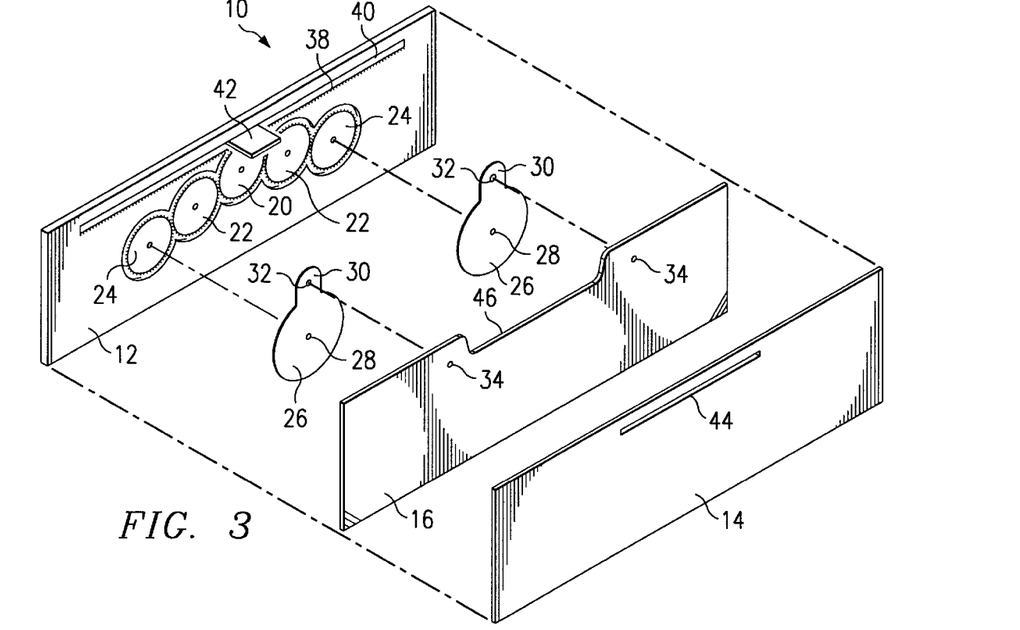
FIG. 3 is an exploded perspective view of another visor in accordance with the invention.

The visor in FIG. 3 is similar in many respects to that shown in FIGS. 1 and 2 and parts corresponding to parts in FIGS. 1 and 2 carry the same reference numerals.

The visor 10 shown in FIG. 3 comprises a back plate 12, front plate 14 and an auxiliary visor sheet 16, as in FIG. 1. The back plate 12 carries a gearing arrangement 18 similar to that shown in FIG. 1. In FIG. 3 the centre gear wheel 20 is driven by a toothed rack 38 which is slidably mounted in an elongate recess 40 formed in the back plate 12. The toothed rack 38 has a tab 42 projecting transversely from a mid part thereof. When the visor 10 is assembled, the tab 42 protrudes through an elongate slot 44 in the front plate 14 to allow the user to actuate the rack 38. Part of the auxiliary visor sheet 16 is cut away, as shown at 46, to allow the tab 42 to pass therethrough.

In use, the user slides the tab 42 along the slot 44 to one side or the other to drive the centre gear wheel 20. That, in turn, drives the idler gear wheels 22 and the outer gear wheels 24, causing the mounting members 26 to rotate in the same direction and through the same angle as each other in similar manner to that shown in FIG. 1. That causes the auxiliary visor sheet 16 to move downwardly and sideways relative to the front and back plates 12, 14. Sliding the tab 42 back towards the middle of the slot 44 returns the auxiliary visor sheet 16 to the stowed position.

Figure 4:
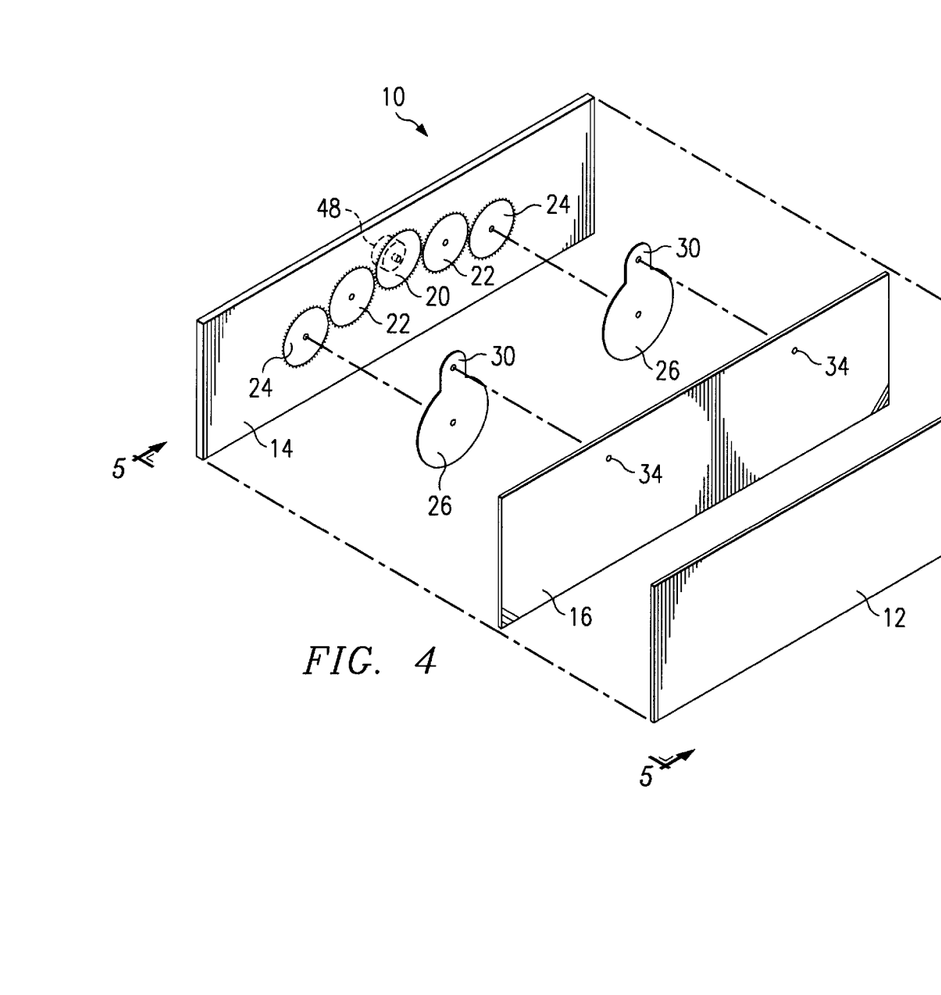
FIG. 4 is an exploded perspective view of a further visor in accordance with the invention.
Figure 5:
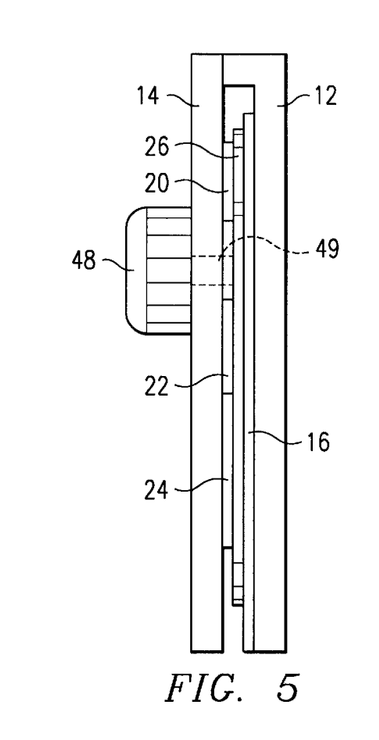
FIG. 5 is a side elevation of the visor of FIG. 4 looking in the direction of arrow V in FIG 4.

FIGS. 4 and 5 show a further embodiment of visor, again similar in some respects to the visor in FIG. 1. Parts in FIGS. 4 and 5 corresponding to parts FIG. 1 carry the same reference numerals.

In FIG. 4 the drawing is a reversal of that shown in FIG. 1 and it will be noted that the gearing arrangement 18 is carried on the front plate 14. The centre gear wheel 20 in this case is driven by turning a handle in the form of knob 48 which is drivably connected to the centre wheel 20 via a shaft 49 which passes through the front plate 14. FIG. 5 shows the visor of FIG. 4 in profile when assembled. The visors of FIGS. 1 to 4 will be of somewhat similar appearance in profile when assembled and it will be noted that despite comprising several components the assembled visor is very compact. The spacing of plates 12, 14 can be seen from FIG. 5.

Figure 5A:
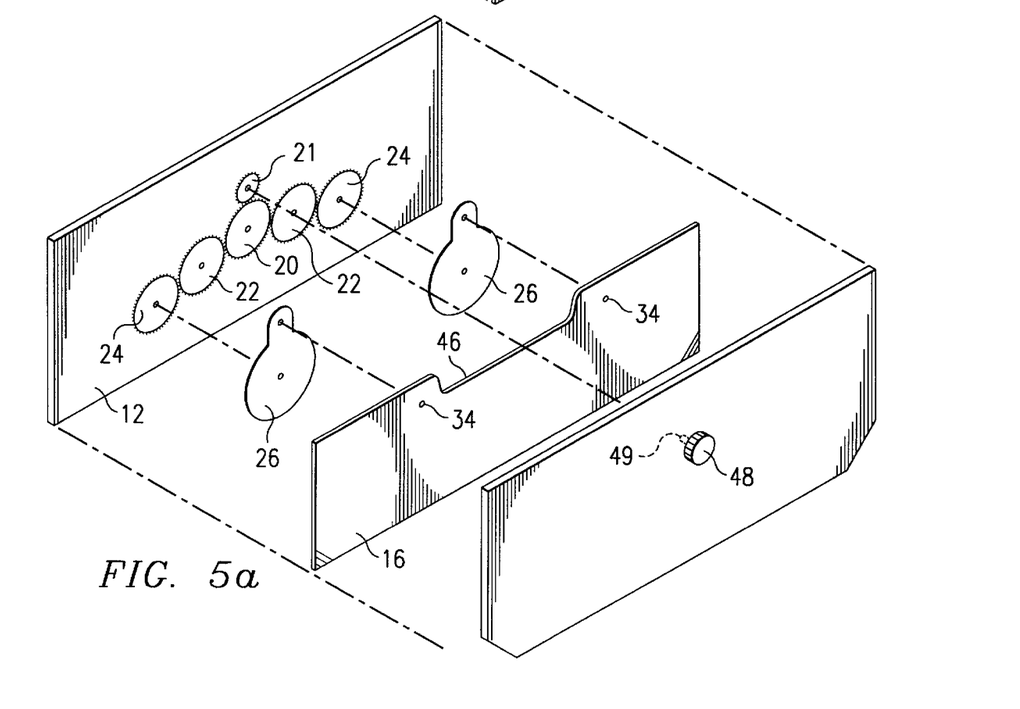
FIG. 5a is an exploded perspective view of a visor similar to the visor of FIG. 4.

Another arrangement where the auxiliary visor sheet 16 is actuated by a rotary knob 48 is shown in FIG. 5a. In that embodiment the gearing arrangement 18 is mounted on the back plate 12, as in FIGS. 1 to 3. In FIG. 5a, the centre wheel 20 is actuated by a cog 21 rotatably mounted on the back plate 12 which cog is drivably connected to the knob 48 via a shaft 49 which passes through the front plate 14. Part of the auxiliary visor sheet 16 is cut away as shown at 46, in similar manner to the FIG. 3 visor, to accommodate the shaft 49.

Figure 6:
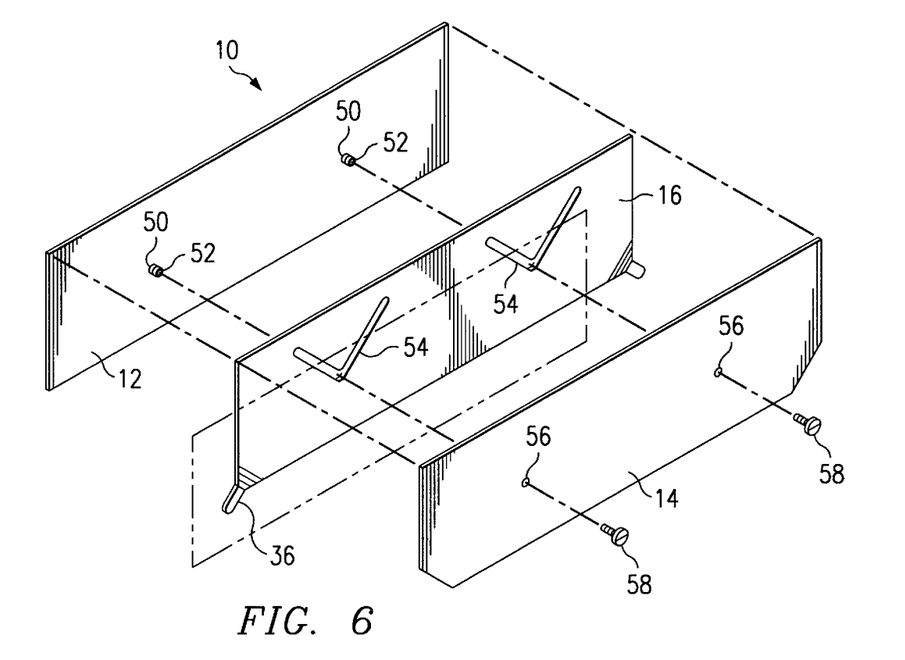
FIG. 6 is an exploded perspective view of a yet further visor in accordance with the invention.

FIG. 6 shows a further visor similar in some respects to that of FIG. 1 and parts corresponding to parts in FIG. 1 carry the same reference numerals.

The visor 10 in FIG. 6 comprises a back plate 12, a front plate 14 and an auxiliary visor sheet 16 located therebetween as in FIG. 1.

The back plate 12 carries spaced apart mounting lugs 50 for the auxiliary visor sheet 16. The lugs 50 have axial screw-threaded bores 52 formed therein.

The auxiliary visor sheet 16 has two V-shaped slots 54 formed therein. The slots 54 are spaced apart and are formed in an upper part of the auxiliary visor sheet 16.

Figure 7:
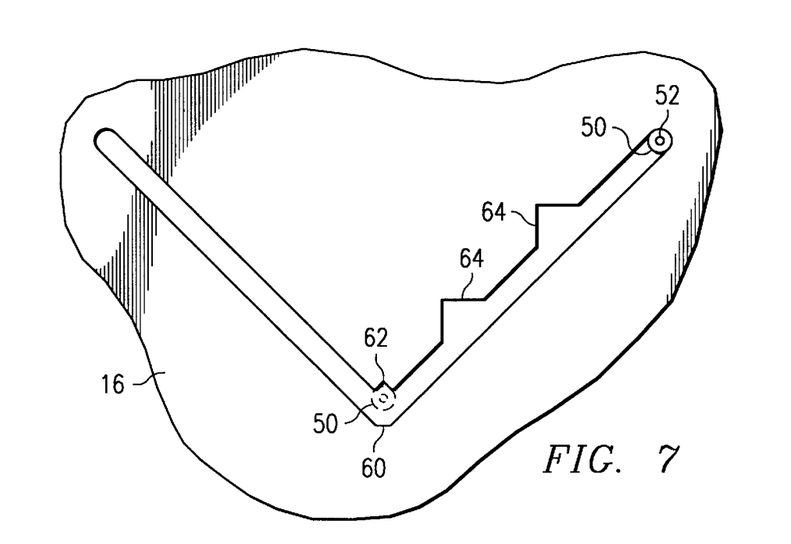
FIG. 7 is an elevation of part of the auxiliary sheet-like visor part of the visor of FIG. 6.

One of the slots 54 is shown in more detail in FIG. 7. As in FIG. 1, the sheet 16 is provided with pull tabs 36.

The front plate 14 has apertures 56 formed therein which receive the lugs 50, upon assembly together of the back and front plates 12, 14. Each lug 50 is arranged to extend through one of the slots 54 in the auxiliary visor sheet 16 and the back and front plates 12, 14 are secured together by means of bolts 58 which are screwed into the screw-threaded bores 52. Upon assembly, the ends of the lugs 50 engage the undersides of the heads of bolts 58. In that way the lugs 50 act to space the front and back plates 14, 12 apart so that the auxiliary visor sheet 16 is free to slide in and out of the visor 10. Alternatively, any other suitable spacer or spacers may be used to space the plates 12, 14.

In order to move the auxiliary visor sheet 16 from its stowed position to its operative position, one of the pull tabs 36 is pulled diagonally downwards. The lugs 50 slide along the respective slots 54 until they reach the end of their respective slot. The slots ensure that the movement of the auxiliary visor sheet 16 is guided and smooth. When it is no longer required, the auxiliary visor sheet 16 can be pushed back to its stowed position wherein each lug 50 lies at the apex 60 of its respective slot 54. The lugs 50 will slide out of the notched portions 62 when the auxiliary visor sheet is pulled manually downwards. Each slot 54 has a notched portion 62 at its apex 60 and the lug 50 lies in the notched portion to prevent the auxiliary visor sheet from gradually sliding out into its operative position due to, for instance vibration of the vehicle in which is carried. Each slot 54 may also have indents 64 formed in the upper edge thereof which receive the lug 50 in different operative positions of the sheet 16. In that way the user can select the amount by which the auxiliary visor sheet 16 protrudes depending upon the light conditions which is particulary advantageous.

The slots 54 could by U-shaped or semi-circular to accommodate movement of the auxiliary visor sheet 16 in either direction. Alternatively, the slot may be unidirectional to allow movement of the auxiliary visor sheet 16 to one side only of the back and front plates 12, 14.

Figure 8:
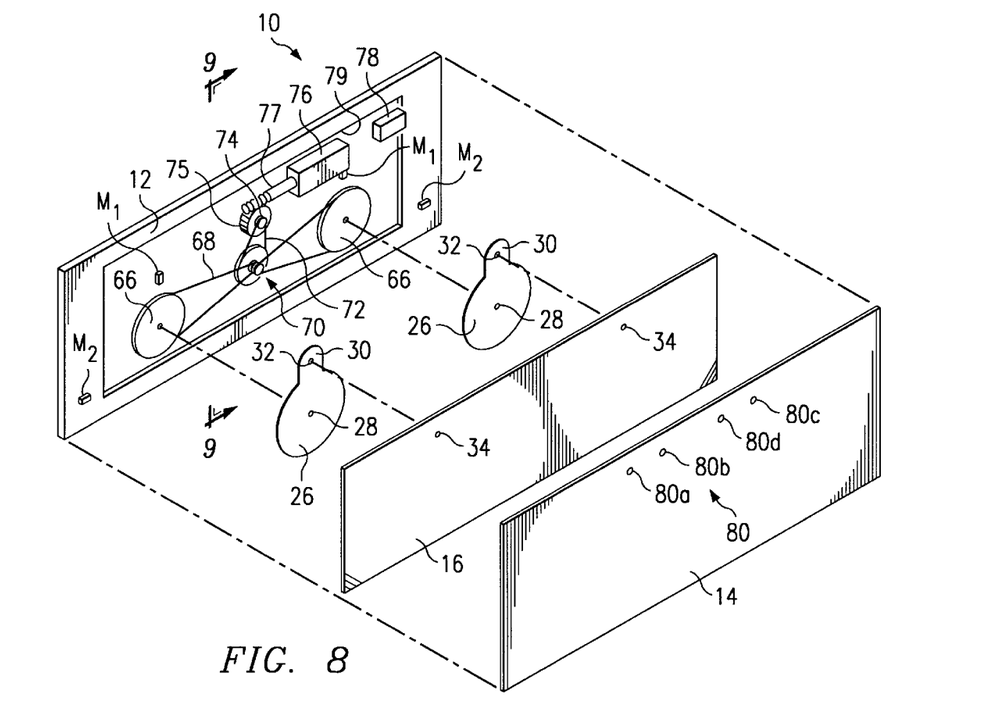
FIG. 8 is an exploded perspective view of a still further embodiment of visor in accordance with the invention.
Figure 9:
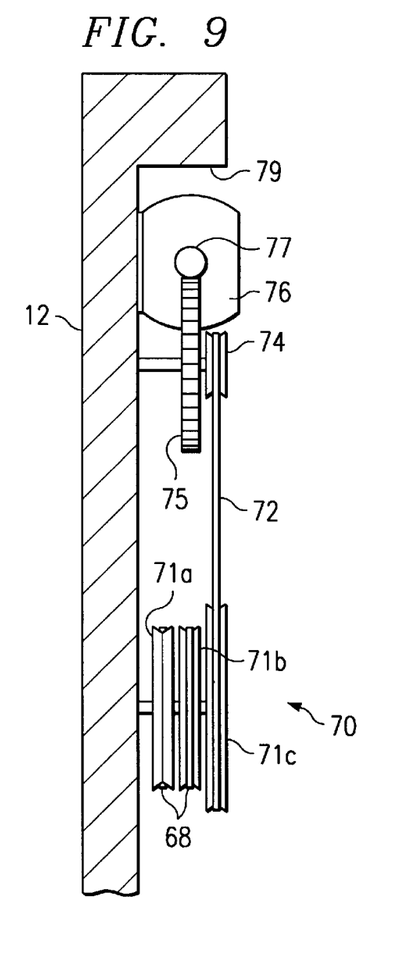
FIG. 9 is a cross-section through part of the visor of FIG. 8 generally on line IX—IX in FIG. 8.

FIGS. 8 and 9 show a further visor in accordance with the invention. The visor in FIGS. 8 and 9 is similar in many respects to that shown in FIG. 1 and parts corresponding to parts in FIG. 1 carry the same reference numerals. In FIGS. 8 and 9 the visor comprises a back plate 12, a front plate 14 and an auxiliary visor sheet 16 located therebetween. As in the visors of FIGS. 1, 3 and 4 the auxiliary visor sheet 16 is carried by mounting members 26. The mounting members 26 are drivably mounted to respective spaced actuating pulleys 66 which, in turn, are rotatably mounted on the back plate 12. The pulleys 66 are connected by belts 68 to a pulley arrangement 70 shown in detail in FIG. 9. The pulley arrangement 70 comprises two drive transmitting pulleys 71a, 71b for transmitting drive via belts 68 to the actuating pulleys 66 and a pulley 71c which is connected by a drive belt 72 to a drive pulley 74. The drive pulley 74 is drivably connected to a gear wheel 75 which is driven by a motor 76 via a worm gear 77. The motor 76 is powered by the battery 78. The whole drive arrangement is mounted in a recessed part 79 on the back plate 12. Push button controls 80 are located on the front plate 14 and are, in use, connected electrically to the motor 76. The controls 80 may comprise a first switch button 80a for moving the auxiliary visor sheet 16 outwards and downwards to the left and a second switch button 80b for retracting the auxiliary visor sheet. A third switch button 80c is used for moving the auxiliary visor sheet 16 outwards and downwards to the right and a fourth switch button 80d is used for retracting the auxiliary visor sheet from that position. Alternatively a single switch eg a rocker switch, could be used to control movement of the auxiliary visor sheet 16.

Micro switches $M_1$, $M_2$ are located adjacent the visor actuating pulleys 66. Each visor actuating pulley 66 has the micro switch $M_1$ located directly above its pivotal axis and the micro switch $M_2$ at one side thereof corresponding to the position of the arm 30 of the mounting member 26 when the auxiliary visor sheet 16 is fully extended to that side. The micro switches $M_1$, $M_2$ are arranged to cut off power to the drive motor 76 when actuated by the mounting members 26. That prevents the visor from being extended or retracted too far. Power is restored to the drive motor after a predetermined period and circuitry may be provided to allow the drive motor 76 to be driven again once a micro switch has been actuated. In that way, if the visor is fully extended, say, to the left the drive motor 76 is deactivated by the member 26 actuating the left hand micro switch $M_2$. Once the predetermined period has expired the drive circuitry allows the drive motor 76 to retract the visor until the upper micro switch $M_1$ is actuated to switch off the motor 76. After a predetermined period, the motor 76 can be operated again to extend the visor to the right or to the left. The micro switch $M_2$ on the right of the visor as shown operates in the same way as the left hand micro switch $M_2$.

The motor 76 may receive power from the vehicle battery dispensing with a requirement for a separate battery.

Figure 10:
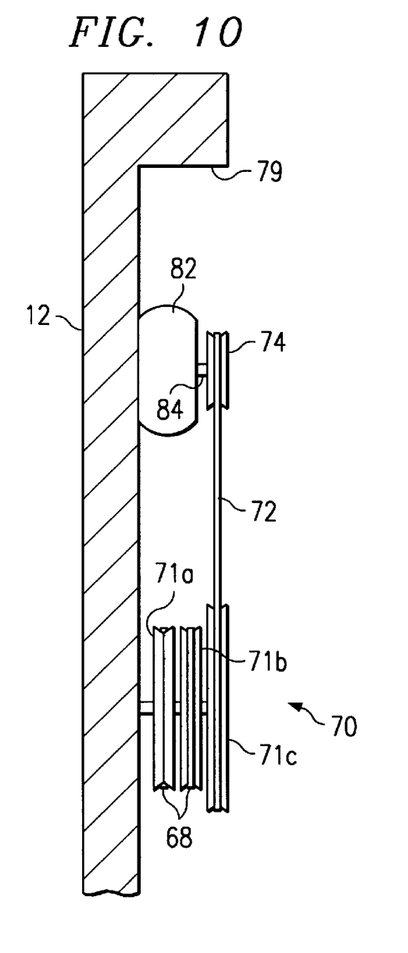
FIG. 10 is a cross-section through part of another visor similar to the visor of FIG. 8.

In FIG. 10 another drive arrangement is shown. In that case a smaller motor 82 than that shown in FIGS. 8 and 9 is arranged to drive the drive pulley 74 directly. The drive pulley 74 is mounted co-axially on output shaft 84 of the motor 82. With that arrangement frictional losses are reduced by eliminating the wheel and worm gearing 75, 77.

It is envisaged that either embodiment of motor 76, 82 may be used to drive the gearing arrangement 18. In such a case the motor 76, 82 drives the centre wheel 20 either via gearing or via a belt as in the case of the motor 82 of FIG. 10.

Figure 11:
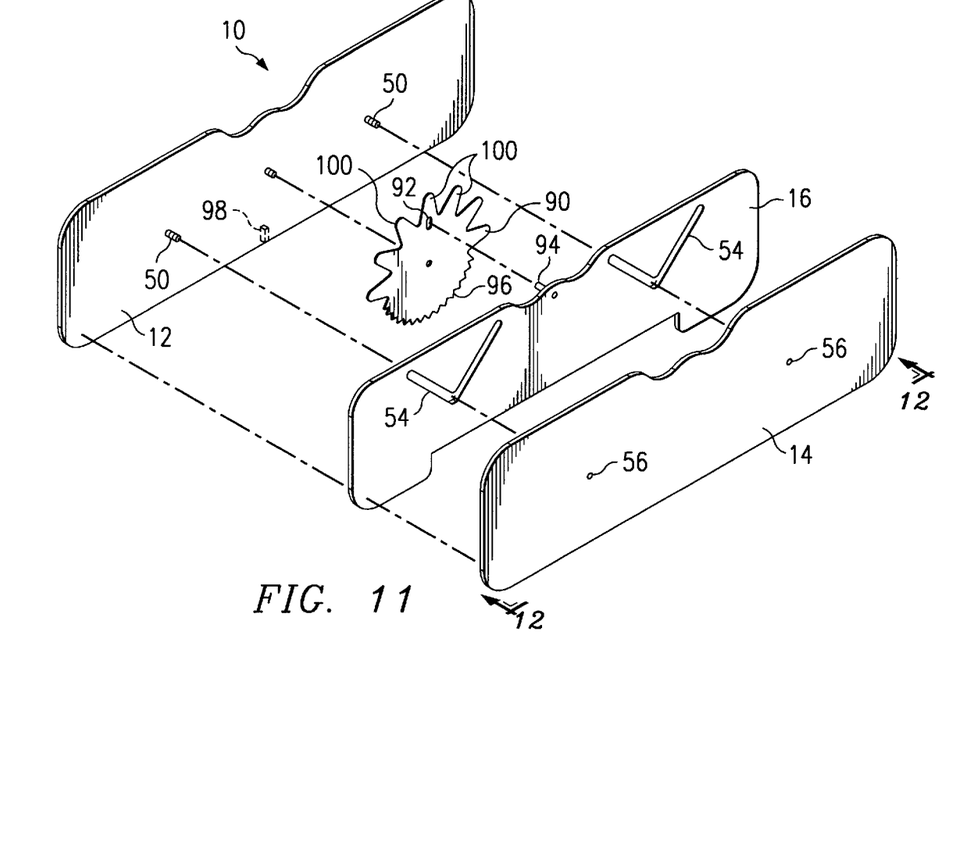
FIG. 11 is an exploded perfective view of a still further embodiment of visor in accordance with the invention.

In FIG. 11 the visor 10 is substantially similar to that shown in FIG. 6 and parts corresponding to parts in FIG. 6 carry the same reference numerals. The visor 10 in FIG. 11 is substantially similar to that in FIG. 6 and thus will not be described in detail with exception that the visor is actuated by the member 90 instead of being pulled manually from the first visor part. The member 90 is generally circular and is pivotally mounted to the back plate 12. A slot 92 is formed in an upper part of the part of the member 90 for co-operation with a projection 94 on the auxiliary visor sheet 16. Thus when the member 90 is rotated about its axis the projection 94 co-operates with the slot 92 on the member 90 to effect movement of the auxiliary visor sheet 16 downwards and sideways. The movement is controlled by the lugs 50 in slots 54. A row of teeth 96 is formed around the lower part of the member 90 and a resilient tang 98 projects upwardly from the backplate 12 to engage with the teeth 96. In that way the member 90 moves with a ratchet like motion so that the auxiliary visor sheets 16 can be extended to any desired position and then retained in that position. A plurality of finger like projections 100 extend from the upper part of the member 90 and protrude above the upper surface of the visor 10 to allow a user to actuate the member. If desired, the upper part of the visor 10 can be cut away to reveal the finger like projections 100.

Figure 12:
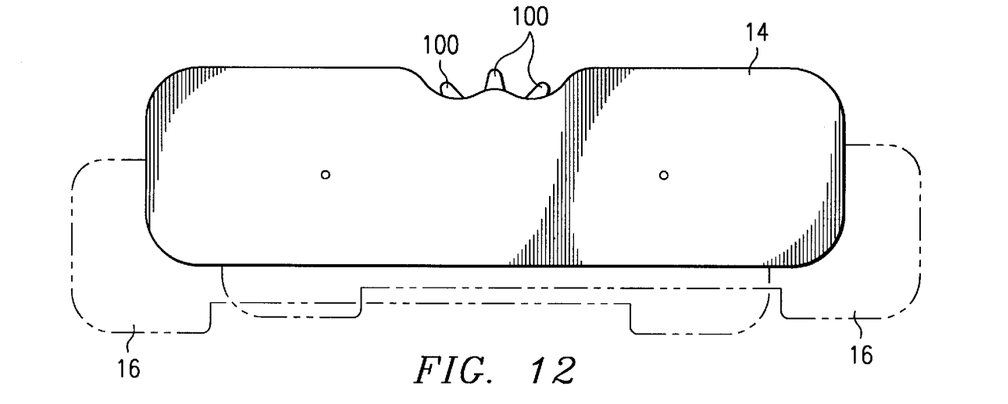
FIG. 12 is an elevation of the visor of FIG. 11 looking in the direction of line XII—XII in FIG. 11.
Figure 13:
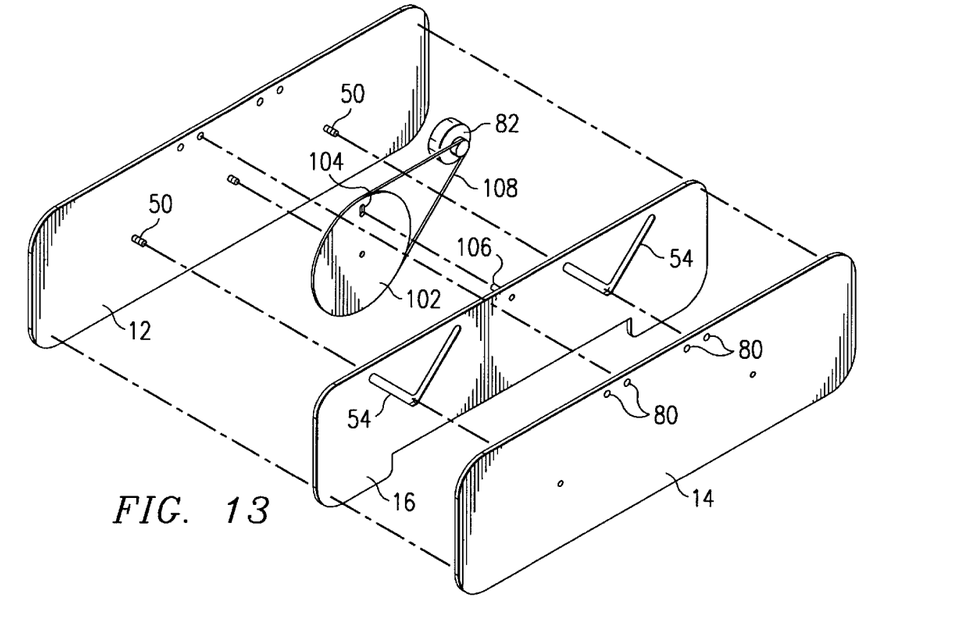
FIG. 13 is an exploded perspective view of a yet further embodiment of visor in accordance with the invention.

FIG. 13 shows a further embodiment of visor 10 similar in merit in many respects to that shown in FIGS. 11 and 12 and parts corresponding to parts in FIGS. 11 and 12 carry the same reference numerals.

In FIG. 13 the auxiliary visor sheet 16 is actuated by a wheel 102 which is pivotally mounted to the backplate 12. An upper part of the wheel 102 as a slot 104 which co-operates with a projection 106 on the auxiliary visor sheet. The wheel 102 is driven by a motor 82 via a belt 108.

Figure 14:
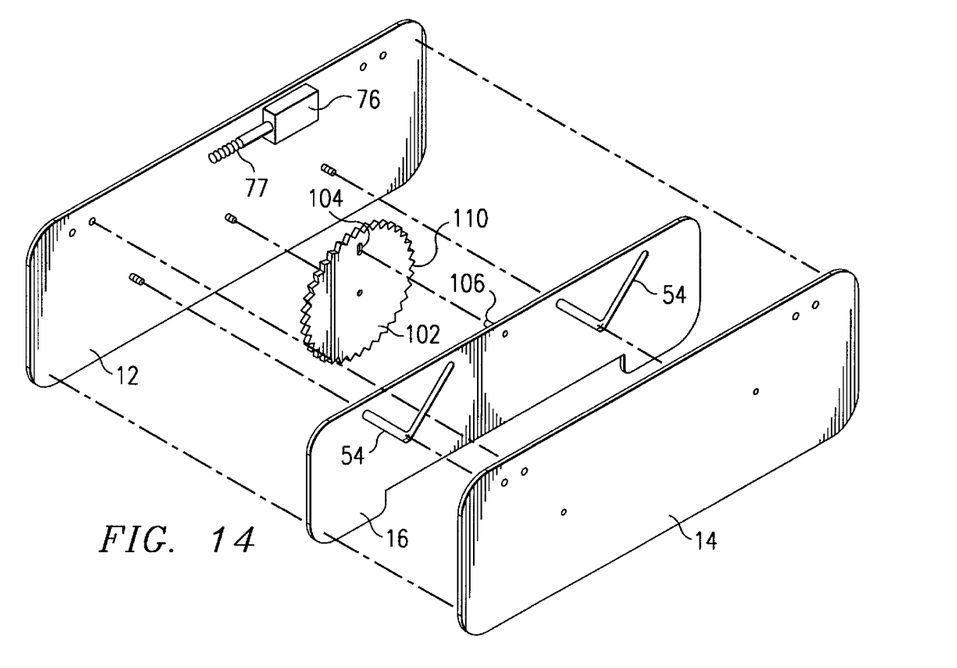
FIG. 14 is an exploded perspective view of a still further embodiment of visor in accordance with the invention.
Figure 15A:
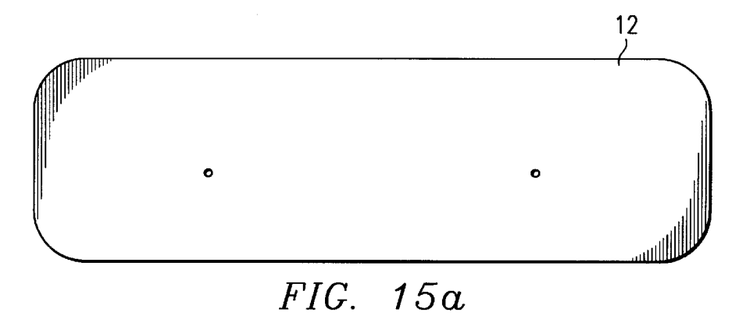
FIGS. 15a–15d show the assembly steps of a still further embodiment of visor in accordance with the invention.
Figure 15B:
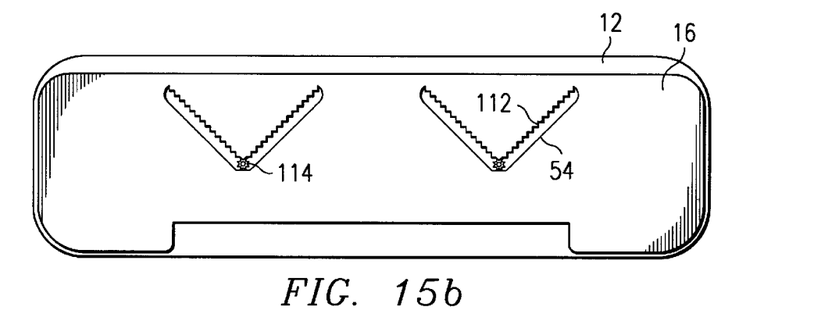
Figure 15C:
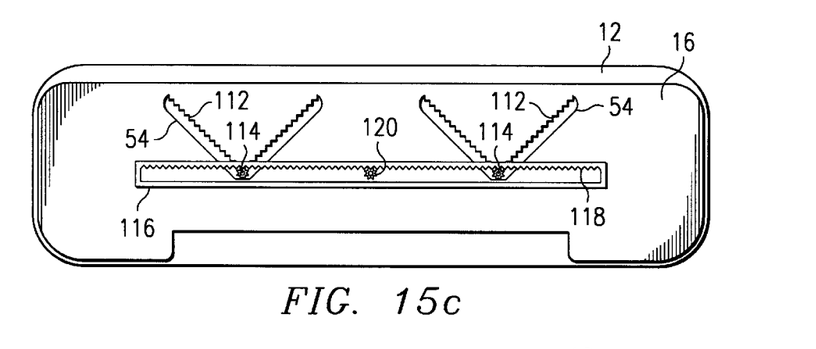
Figure 15D:
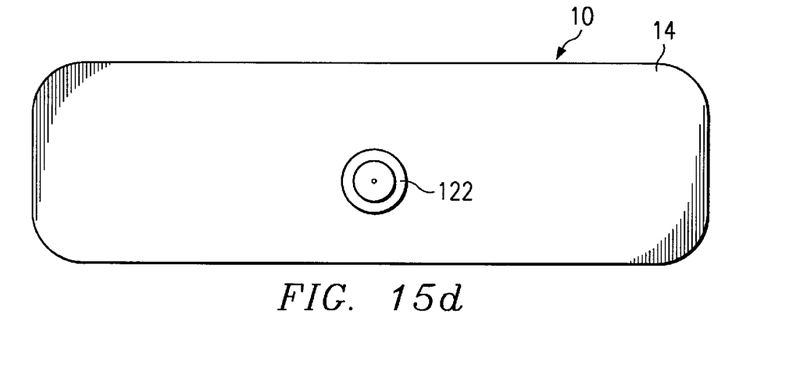

The embodiment of FIG. 14 is substantially similar to the embodiment of FIG. 13 with the exception that the wheel 102 has a toothed edge 110 and is driven by means of a motor 76 driving a worm gear 77.

FIGS. 15a–15d illustrate the assembly of a further embodiment of visor 10 in accordance with the invention. The visor shown in FIG. 15a–15d is similar to many respects to that shown in FIG. 6 and parts corresponding to parts in FIG. 6 carry the same reference numeral. The visor 10 in FIG. 15 comprises a backplate 12, an auxiliary visor sheet 16 with two V-shaped slots 54. The V-shaped slots 54 each have a row of teeth 112 on their respective upper surfaces and a toothed wheel 114 which is rotatably mounted to the backplate 12 and which extends through the respective slot 54. The toothed wheel 114 is shown in more detail in FIG. 16. An elongate actuating member 116 is provided between the auxiliary visor sheet 16 and a front plate 14. The toothed wheels 114 in the slots 54 extend into the actuating member 116. A rack of teeth 118 is formed on the upper surface of the actuating member 116. The toothed wheels 114 mesh with the teeth in the rack 118. An actuating toothed wheel 120 is rotatably mounted to the front plate 14 and extends into the actuating member 116 in mesh with the rack teeth of the rack 118. The actuating tooth wheel 120 can be rotated by means by of a knob 122 on the front face of the front plate 14.

Figure 16:
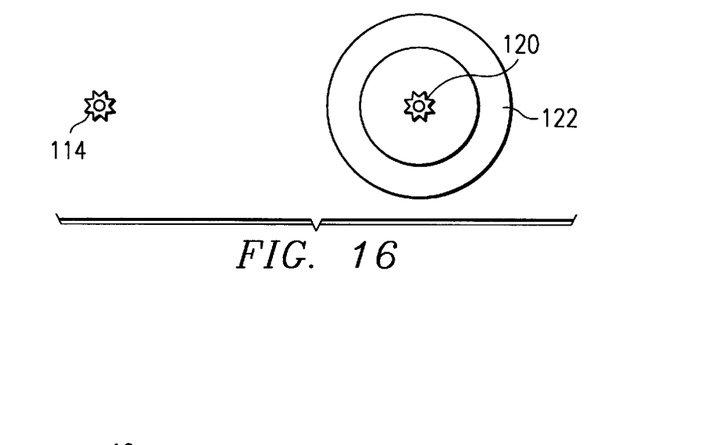
FIG. 16 is an elevation of the toothed wheel and the actuating wheel of the visor of FIG. 15 shown to a greater scale.

FIG. 16 shows one toothed wheel 114 and the actuating tooth wheel 120 to a larger scale.

Figure 17:
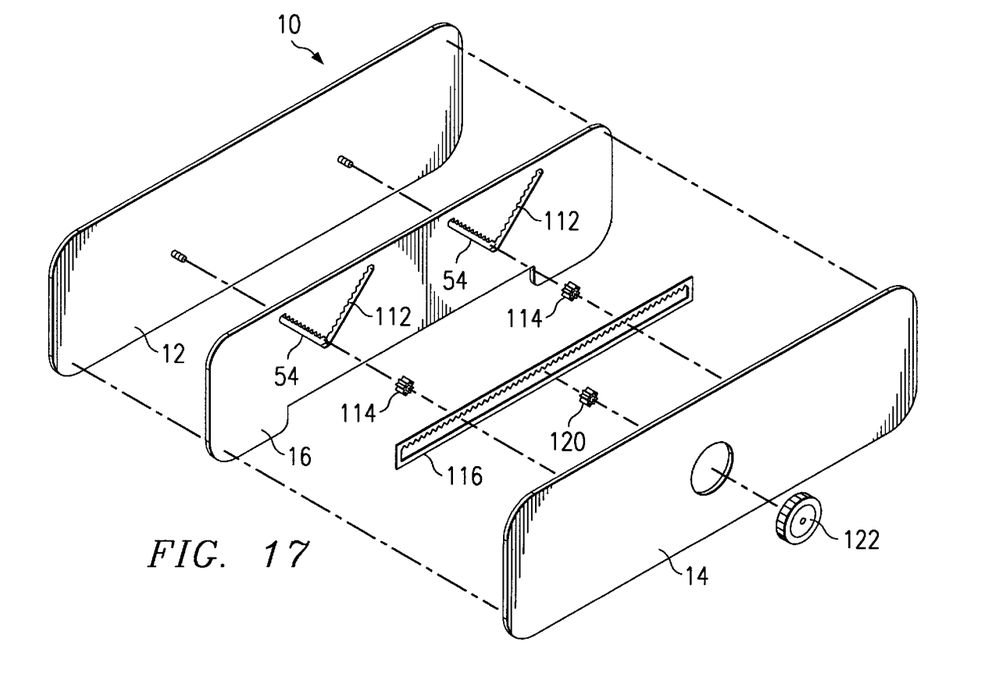
FIG. 17 is an exploded perspective view of the visor of FIGS. 15a–d and 16.

FIG. 17 shows the visor of FIG. 16 in a exploded perspective view. In order to operate the visor of FIG. 17 the knob 122 is turned which, in turn, rotates the actuating tooth wheel 120. That causes the actuating member 116 to move laterally which rotates the toothed wheels 114 in the respective slots 54. The toothed wheels 114 effect movement of the auxiliary visor sheet 16 by engaging the rows of teeth 112 in the slots 54.

Figure 18:
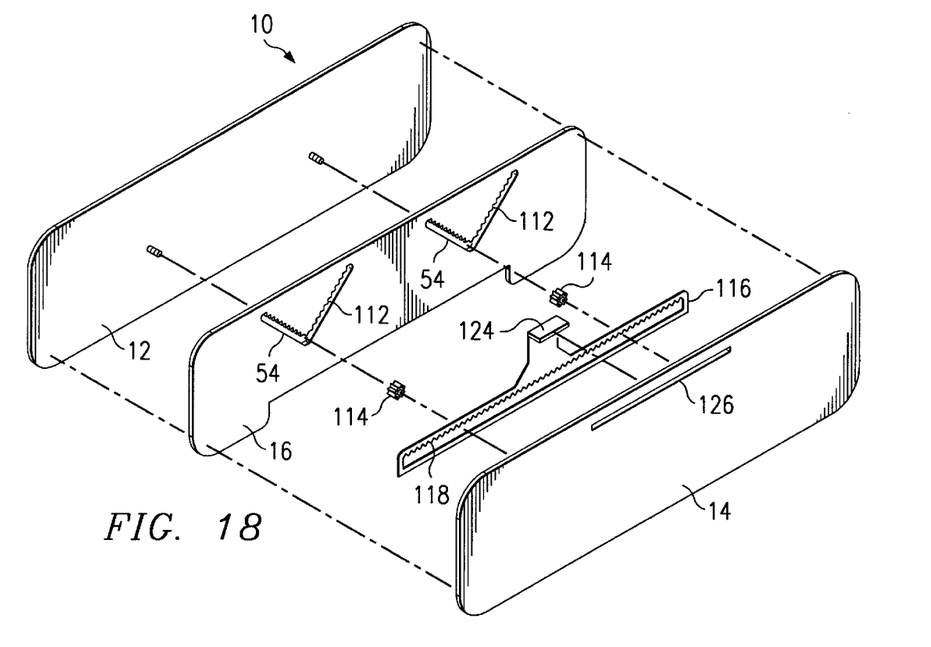
FIG. 18 is an exploded perspective view of a further visor in accordance with the invention.
Figure 19:
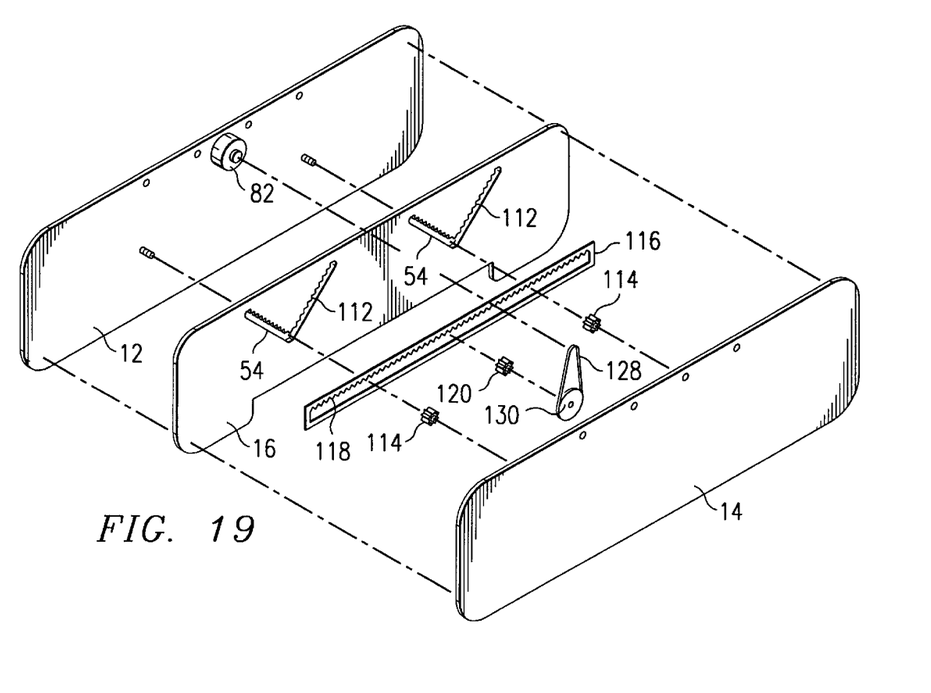
FIG. 19 is an exploded perspective view of a yet further embodiment of visor in accordance with the invention.

FIGS. 18 and 19 show embodiments of visor which are substantially similar to that shown in FIGS. 15–17 and parts corresponding to parts in FIGS. 15–17 carry the same reference numerals.

In the FIG. 18 visor 10 the auxiliary visor sheet 16 is actuated in substantially similar fashion to the visor of FIGS. 15–17 the exception that the elongate actuating member 116 is actuated manually by means of sliding a projecting tab 124 along a slot 126 in the front plate.

In the embodiment of FIG. 19, again the auxiliary visor sheet 16 is actuated in similar fashion to that shown in FIGS. 15–17. However, the elongate actuating member 116 is moved laterally by means of a actuating toothed wheel 120 engaging with the rack 118. The toothed wheel 120 in FIG. 19 is rotated by means of a motor 82 via a belt 128 and pulley 130.

Figure 20:
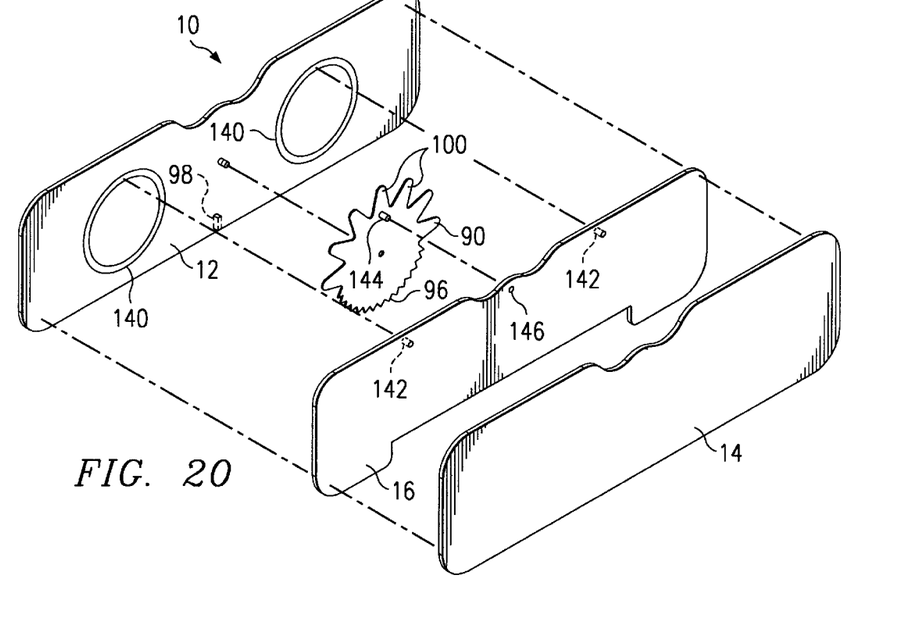
FIG. 20 is an exploded view similar to FIG. 11 showing a still further embodiment of visor in accordance with the invention.

In FIG. 20, an arrangement similar to FIG. 11 is shown except that the tracks, indicated at 140, are in the form of circular grooves formed in the back plate 12. The auxiliary visor sheet 16 carries studs 142 which fit slidably into the tracks 140. The member 90 is similar to that in FIG. 11 except that it has a pin 144 thereon which locates in a hole 146 in the auxiliary visor 16. The member 90 is rotatably mounted on the back plate 12. The backplate 12 has a tang 98 thereon, preferably resilient, which co-operates in a ratchet like manner with teeth 96 around the lower half of the member 90.

The studs 142 are spaced apart by the same distance as the centres of curvature of the tracks 140 and the centres of curvature of the tracks 140 and the axis about which the member 90 rotates are contained in a common plane (not shown).

By rotating the member 90, the auxiliary visor sheet 16 moves downwardly and sideways relative to the front and back plates 14, 12 with the tracks 140 guiding the studs 142.

If the entire member 90 is formed with teeth 96, the member 90 can be rotated through 360 degrees if required so that the auxiliary visor turns through full circle.

Figure 21:
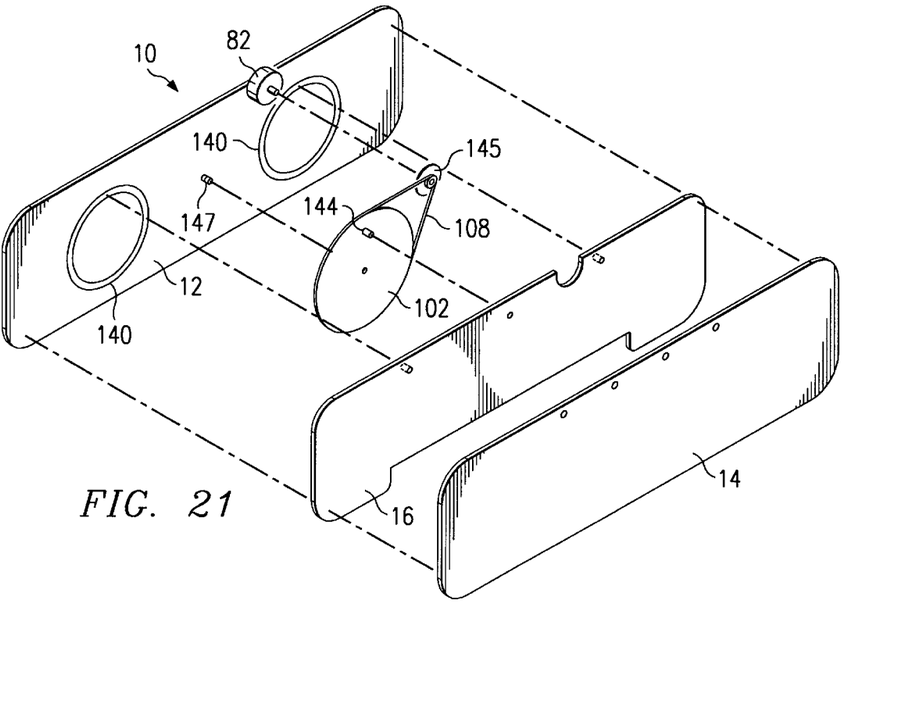
FIG. 21 is motorised version of the embodiment shown in FIG. 20.

In FIG. 21, an electric motor 82 drives a pulley 145 which itself drives a wheel 102 via a belt 108. The wheel is rotatably mounted on a pin 147 on the backplate 12 and has a pin 144 thereon located as in FIG. 20. In other respects the arrangement is the same as in FIG. 20 and the motor 82 provides powered operation of the auxiliary visor sheet 16.

All of the visors shown may be fitted as standard sun visors in vehicles and will normally be pivotally connected to the vehicle adjacent the windscreen or other required part. Alternatively, the visors may be retro-fittable to existing vehicles by attaching the visor 10 to the standard visor in the vehicle, for instance by means of fasteners or adhesive. All of the embodiments can be manufactured in a slim format to enable retro fitting. It is envisaged that an existing visor may be adapted to include a visor in accordance with the invention.

What is claimed is:

1. A visor comprising a main movable first visor part and an auxiliary sheet like second visor part for movement in the plane of the sheet and guide means for guiding the second visor part during movement thereof downwardly and sideways from a stowed position on the first visor part, the guide means comprising a diagonal slot in the second visor part and a co-operable member on the first visor part, the visor further having drive means comprising a row of teeth formed in the diagonal slot and a toothed wheel whereby rotation of the toothed wheel effects movement of the second part relative to the first part, the toothed wheel forming the aforesaid cooperable member.

2. A visor according to claim 1 in which the movement of the second visor part is translational.

3. A visor according to claim 1, wherein the diagonal slot is replaced with two slots arranged transversely relative to one another and preferably intersecting one another.

4. A visor according to claim 3 in which the slots are arranged to define a v-shaped slot.

5. A visor according to claim 1 in which two slots are provided, each slot being co-operable with a respective said co-operable member.

6. A visor according to claim 1 in which the slot has a notched portion which receives the co-operable member when the second visor part is in a selected position such as the stowed position to retain the second visor part in the selected position.

7. A visor according to claim 1 in which the first visor part is hinged in the vehicle, in use, for movement between a retracted position away from a windscreen of the vehicle and a position adjacent the windscreen.

8. A device according to claim 1 in which the second visor part is transparent.

9. A device according to claim 1 in which the second visor part is coloured.

10. A visor comprising a main movable first visor part and an auxiliary sheet like second visor part carried on the first visor part for movement in the plane of the sheet and guide means for guiding the second visor part during movement downwardly and sideways from a stowed position on the first visor part, the guide means comprising a track on one of the first and second parts and a co-operable member on the other of the first and second parts and the visor further comprises drive means for moving the second visor part relative to the first visor part, wherein the track is circular.

11. An auxiliary visor for a vehicle comprising a first visor part and an auxiliary sheet-like second visor part carried on the first visor part for movement in the plane of the sheet and guide means for guiding the second visor part during movement downwardly and sideways from a stowed position on the first visor part, the guide means comprising a diagonal slot in one of the first and second visor parts and a co-operable member on the other of the first and second visor parts.

12. A visor comprising a main movable first visor part and an auxiliary sheet-like second visor part for movement in the plane of the sheet and guide means for guiding the second visor part during movement thereof downwardly and sideways from a stowed position on the first visor part, the guide means comprising a V-shaped slot in the second visor part and a cooperable member on the first visor part, the visor further having drive means for moving the second visor part relative to the first visor part, whereby the V-shaped slot enables the second visor part to be deployed on either side of the first visor part.

* * * * *